United States Patent [19]

Gilbert

[11] Patent Number: 4,781,958
[45] Date of Patent: Nov. 1, 1988

[54] SEALED EDGE DETECTABLE TAPE

[75] Inventor: Ronald E. Gilbert, Katy, Tex.

[73] Assignee: Reef Industries, Inc., Houston, Tex.

[21] Appl. No.: 98,715

[22] Filed: Sep. 21, 1987

Related U.S. Application Data

[63] Continuation of Ser. No. 804,309, Dec. 3, 1985, abandoned.

[51] Int. Cl.$^4$ .................. B32B 1/04; B32B 3/02; B32B 15/08
[52] U.S. Cl. .................. 428/76; 405/157; 428/204; 428/207; 428/457; 428/458; 428/461
[58] Field of Search .................. 428/457, 204, 68, 76, 428/207, 458, 461; 350/96.23; 405/157; 116/211, 67 R, DIG. 14

[56] References Cited

U.S. PATENT DOCUMENTS

| | | | |
|---|---|---|---|
| 1,919,677 | 7/1933 | Young | 428/76 |
| 3,115,861 | 12/1963 | Allen | 116/211 |
| 3,282,057 | 11/1966 | Prosser | 405/157 |
| 3,421,328 | 1/1969 | Oosterbaan | 405/157 |
| 3,504,503 | 4/1970 | Allen | 405/157 |
| 3,568,626 | 3/1971 | Southworth | 405/157 |
| 3,581,703 | 6/1971 | Hosack | 116/67 R |
| 3,633,533 | 1/1972 | Allen et al. | 116/211 |
| 3,908,582 | 9/1975 | Evett | 116/211 |
| 4,076,382 | 2/1978 | Oestreich | 350/96.23 |
| 4,271,218 | 6/1981 | Heckel et al. | 428/76 X |
| 4,312,599 | 1/1982 | Darolia | 403/29 |
| 4,613,536 | 9/1986 | Makilaakso | 428/76 X |
| 4,623,282 | 11/1986 | Allen | 405/157 |

Primary Examiner—Thomas J. Herbert
Attorney, Agent, or Firm—Vaden, Eickenroht, Thompson & Boulware

[57] ABSTRACT

A detectable tape including a ductile metal foil layer which is enclosed in a sheath of thermoplastic coating which provides a sealed edge along the length of the tape. The thermoplastic coating sheath protects the foil from corrosion when the detectable tape is placed underground above a nonmetallic body such as plastic pipe. The sealed edge detectable tape can also include a reinforcement layer which provides additional tensile strength.

16 Claims, 2 Drawing Sheets

SEALED EDGE DETECTABLE TAPE

This is a continuation of application Ser. No. 804,309 filed Dec. 3, 1985, now abandoned.

BACKGROUND OF THE INVENTION

The detection of underground pipes and utility lines is a necessity when any construction work involving digging trenches is necessary. Many types of service lines such as telephone and telegraph cables, gas and sewer lines, electrical lines and water mains are located below the surface. It has become increasingly popular to utilize plastic pipe or plastic wrapped cables in this service. Also, ceramic and other nonmetallic materials such as concrete are used in underground service. The precise location of the nonmetallic lines cannot be determined by the metal detectors above ground used to locate metal pipe. It is important to have a simple method to locate these underground lines when underground construction is in the vicinity or repair of the lines is needed.

This problem has been addressed in several patents. In U.S. Pat. No. 3,115,861 a frangible colored body is laid underground over the buried service line. The colored body has a water insoluble color and has the benefit of being visible when contacted with soil during digging operations to warn the operator of the proximity of a service line. In U.S. Pat. No. 3,282,057 the use of a colored plastic tape laid over a service line when it was installed was disclosed. The plastic tape is colored and when it is pulled up by a digger, it provides a warning of the proximity of a buried line. Both patents have the drawback that the colored frangible bodies or tapes are not detectable from the surface. Also, the use of excavation equipment which makes deep entrenchments may encounter the colored body or tape. and the line in one operation which would provide no warning.

In U.S. Pat. No. 3,504,503 a method was disclosed for locating underground lines of the construction discussed herein which included using a metallic foil with a moisture and soil resistant coating and a coloring to distinguish from the soil. The colored foil frangible body is laid over the service line. The benefit of the foil is that metal detectors can be used to locate the foil and thereby the location of the service line.

In U.S. Pat. No. 3,633,533, a method to locate underground service lines is disclosed using a metal film coated with a colored plastic. The plastic is moisture and soil resistant. In an alternative embodiment a metallic wire is under the plastic coating. The plastic coated foil tape is used quite extensively. There are color codes for water, gas, electric, buried telephone and telegraph lines and other services. The tapes are printed with a cautionary message corresponding to the type of service line underlying the tape. With the proliferation of plastic pipe the tapes have widespread use throughout the world.

The plastic coated metallic tapes have a life of about six to seven years. The life of the tape depends upon the moisture and soil conditions which will invade the edges of the tape where the metal is exposed and cause corrosion of the metallic element. There are certain bacterial conditions which contribute to an environment which will cause corrosion of the metallic element and deterioration of the pigment. Also, many of the tapes have printed messages on the outside of the tape which will wear off with abrasion.

The plastic coated tapes in use have other drawbacks. When a trench is dug for a utility line and a detectable tape is used, typically, the line is laid first. Then there is a partial backfilling of the trench and the tape is laid over the line coming off a roll on a tractor. Then in a continuous process the trench backfilling is completed. As the tape is laid there may be some tension placed on it, as the backfill process is completed, stretching the tape. During this process if too much tension is placed on the tape, it can break causing the operation to be halted until the tape can be mended. Also, the foil layer is not elastic and tension on the tape may cause the metallic foil to break while the plastic coatings are stretched. In some cases a continuous length of metallic conductive material is desirable. Also, the present plastic coated types have a tendency to curl on the edges and care must be taken when laying the tape that it does not become twisted or folded. Although the plastic coated metallic foil tapes have provided a cost efficient method to detect underground piping systems, there are some aspects which can be improved upon.

SUMMARY OF THE INVENTION

The present invention is an improved detectable tape which is reinforced and provides a sealed edge along the length of the tape. The foil layer of the tape is completely surrounded by a sheath of thermoplastic coating which protects the foil from corrosion. The main factor in determining the life of a detectable tape is the length of time that the metal foil can withstand corrosion. In the present types of tape, the edges are exposed and water and soil can invade at the edge and cause eventual corrosion of the tape. The corrosion starts immediately as the tape is laid. With a continuous protective coating, the moisture and other corrosive elements would have to penetrate the thermoplastic sheath first to get to the foil. It is anticipated that the improved sealed edge detectable tape will have a useful life of at least 25 years.

In addition to the sealed edge other embodiments of the improved tape can be reinforced by the thermoplastic coating or a reinforcing material incorporated into the tape. The thermoplastic coating sheath can be of a high tensile strength material such as polyester. Another layer can be included in the tape such as a polyester layer or a reinforcing fabric. The reinforcing material imparts strength to the tape such that the foil is protected from tearing. The sheath coating in this embodiment does not have to have a high tensile strength and can be a polyethylene or any other thermoplastic film.

A reinforcing material which imparts particularly improved properties to the sealed edge tape in addition to those described above is a nonwoven high density polyethylene fabric. The reinforcing polyethylene fabric is laminated to the foil layer and a thermoplastic coating sheath encloses the tape so that the edges are sealed from exposure. The reinforced tape exhibits very high tensile strength. Another property is that the tape does not have a tendency to curl at the edges or twist. The tape lies flat. These properties are beneficial from the installation viewpoint, because as the reinforced tape comes off the roll into the trench, there is less likelihood to tear because of the high tensile strength and the tendency of the tape not to curl will make it easier to lay the tape out in the trench.

The sealed edge tape has all the other benefits of earlier tapes such as carrying a printed message and color coding to designate the type of underground service and provide visibility in the soil. The tape can have a layer of color coating as part of the tape construction. The color coating layer will also be enclosed in the sheath of thermoplastic and the extent that environment factors and bacteria tend to degrade certain pigments the color is protected by the sealed edge.

The sealed edge tape has the same practical, economical advantages of the earlier detectable tape models. The metal detection equipment can locate the utility or other underground service in the same manner. The life of the tape will have a markedly longer lifetime with the metal foil layer protected from corrosion and the color pigment similarly protected when necessary. The reinforced embodiments provide high tensile strength and physical properties which facilitate installation.

BRIEF DESCRIPTION OF THE DRAWINGS

The present invention may take any of several forms or embodiments some of which are illustrated in the accompanying drawings wherein.

DETAILED DESCRIPTION OF THE PREFERRED EMBODIMENTS

Figure 1:
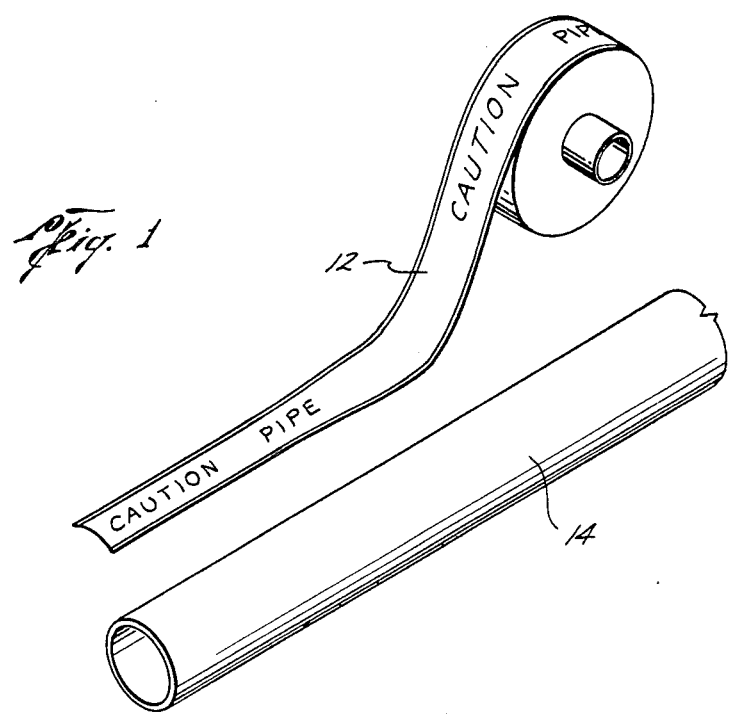
FIG. 1 is a view of the sealed edge detectable tape as placed in service over a pipe.

FIG. 1 is a view of a roll 10 of sealed edge detectable tape 12 being laid over a pipe 14. The tape is most useful when the pipe 14 is a nonmetallic construction such as ceramic or plastic. The tape can be laid over telephone cables and buried electrical lines in addition to the piping system shown in FIG. 1. Any type of underground service which needs to be located to be protected from digging equipment operating in the vicinity or located for repairs can be covered with the detectable tape.

The tape can be laid directly on the pipe, cable or other underground construction. More typically, the pipe, cable or underground construction is laid first in the prepared trench. The trench is then partially backfilled and the detectable tape 12 is laid with the underground system approximately directly below the tape 12. The roll 10 is placed on a tractor or other piece of equipment used in the field. The backfilling and tape laying is often an almost simultaneous process and backfill dirt can place stress or tension on the tape during the procedure.

The tape generally carries a printed message of caution that a pipe or cable is buried as shown in FIG. 1. The printed message can include the type of service or any other cautionay message desired. Also, the tapes are color coded according to the service lying under the tape with a particular color generally associated with water, gas, electrical and buried phone lines. The color generally contrasts to the soil so that the tape is visible when digging operations occur to locate the line.

Figure 2:
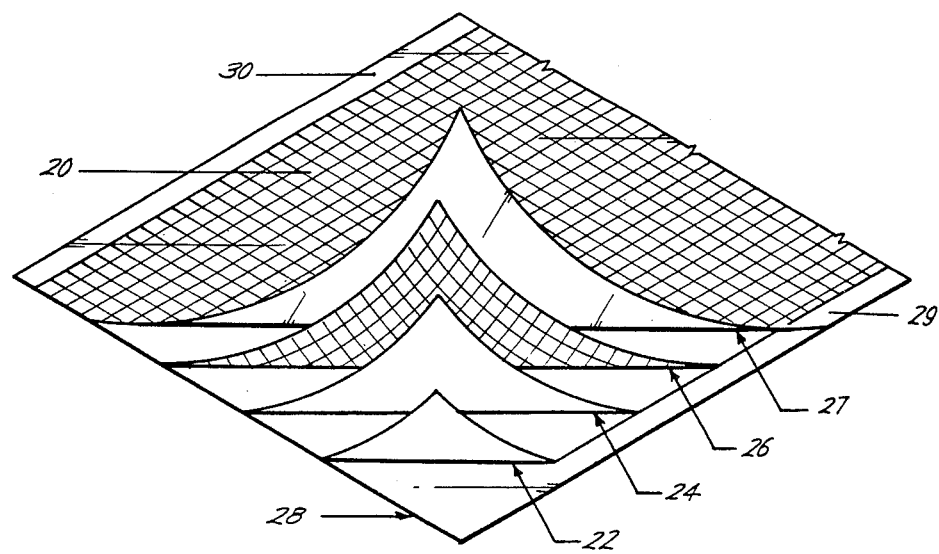
FIG. 2 is a cross-section view of the nonwoven fabric reinforced sealed edge detectable tape.

FIG. 2 shows one embodiment of a section sealed edge tape 20 with a nonwoven fabric reinforcement material. The section of seal edge tape has the layers separated in FIG. 2 to show the relationship of the materials used to make this embodiment. The foil layer 22 can be any desired thickness depending on the service of the product with typical range of between about 0.1 and about 3 mils. The foils can be any ductile metal alloys such as aluminum, copper, steel, silver and iron. The foil typically used commercially is aluminum because of the cost and ease of handling.

The foil is laminated with a colored coating layer 24 over which the layer 26 of reinforcement fabric is placed. The colored coating can be any types of color impregnated film. The typical color coating is a coating grade low density polyethylene with a stable pigment. The coating can be other thermoplastic polymers or blends which will carry a pigment. The color pigment chosen relates to the color code corresponding to the buried service line or any other color desired by the user.

The reinforcing nonwoven material can be any type of flexible material which will provide the tensile strength desired for the tape. The reinforcement layer can be chosen from the high performance engineering polymers which have the desired strength characteristics. These polymers can include polypropylene, nylon and polyester. The reinforcing material can also include polyimide and carbon fibers. If the reinforcing material is laid over the color coating, it should be substantially transparent so that the color layer 24 underneath will be visible.

The reinforcing layer 26 shown in FIG. 2 is a nonwoven fabric of high density polyethylene which imparts a texture of the fabric to the finished product. A reinforcement fabric which was used in the preferred embodiment is Conwed product No. CC1001 which is a high density polyethylene nonwoven fabric. The Conwed products come in various weights and can be chosen depending on the strength desired. Other reinforcing materials with similar characteristics can be used also. With Conwed No. CC1001 the color coating underneath clearly shows through in the finished product. During the lamination process the color coating migrates through the interstices of the fabric and since the fabric is essentially clear the color shows through the layer of the fabric as well.

After the foil 22, color coating 24 and reinforcing material 26 are laminated together, the tape can be printed with a cautionary message on either side of the laminate and then coated with the outer thermoplastic sheath. The lettering would be protected from the moisture, soil conditions, bacteria and abrasion. The outer coating layers 27 and 28 which forms the sheath around the laminate can be of any type of thermoplastic. If a reinforcing layer 26 has been used, it is not necessary to have a high tensile strength resin for the coating. Any low density polyethylene coating resin or other thermoplastic can be used. It is necessary that the coating resin extend beyond the laminate and seal together to form sealed edges 29 and 30 which run lengthwise on either edge of the tape.

If for any reason a color coating is not desired, the color coating can be omitted from the manufacturing to give a plain metallic tape. The color coating is generally applied to one side of the tape however, if desired, color coating could be applied to one or both sides of the tape. Also, printing a cautionary or informative message is optional depending on the use. The printed message may be applied to outer sheath coating if desired. It is apparent that to practice the invention many variations of color, printing and reinforcement are available depending on the needs of the user.

A sealed edge detectable tape of the construction shown in FIG. 2 was prepared from aluminum foil 0.35 mils, coating resin Gulf P E 1017 with 5% blue color concentrate extrusion coating grade low density polyethylene laminated with Conwed CC1001 high density polyethylene nonwoven fabric. The laminate was coated with a sealed edge by a low density polyethylene coating resin Gulf P E 1017. The finished tape was 6 inches wide with about a ¼ inch seal edge extending from the laminate. The finished tape laid very flat without a tendency to curl. The following physical properties were shown as compared to TerraTape ® Detectable by Reef Industries, Inc. which is a tape now used for underground detection of non-metallic lines.

TABLE 1

| Property | Example 1 | TerraTape ® |
|---|---|---|
| Thickness | 14 ± 2.5 mils | 5.0 ± 0.5 mils |
| Tensile Strength ASTM-D-882 | | |
| 1″ Tensile machine direction | 40 lbs.(min.) | 23 ± 2 lbs. |
| transverse direction | 48 lbs.(min.) | 26 ± 3 lbs. |
| 1″ Elongation machine direction | 40% (min.) | 85% ± 10% |
| transverse direction | 60% (min.) | 65% ± 10% |
| Standard Weight | 58 ± 5 lbs/msf | 28 ± 2 lbs/msf |
| Boil Delamination | less than 10% delam. | less than 10% delam. |
| Tongue Tear ASTM - D-2261 | | |
| machine direction | 19 lbs.(min.) | 12 oz. avg. |
| transverse direction | 12 lbs.(min.) | 9 oz. avg. |
| Dart Drop ASTM - D-1709 | 462 g nominal | 400 g nominal |

Figure 3:
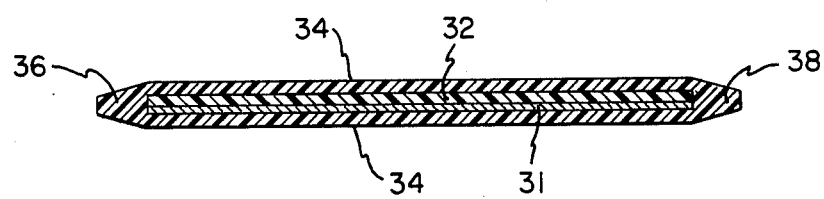
FIG. 3 is a cross-section of sealed edge detectable tape.

FIG. 3 is an embodiment of a sealed edge detectable tape that does not use a separate reinforcing material to give the tensile strength. FIG. 3 is an enlarged cross-section view showing the foil layer 31 which has been laminated to a color coating layer 32. The color coating can be any type of pigment carrying film or optional as the user desires as previously discussed. The outer sheath 34 is made of a polymer or blend that has sufficient tensile strength to serve as a reinforcing material as well as a continuous coating. The outer sheath 34 can be made of polyester, oriented polypropylene and nylon as well as other resins with similar tensile characteristics chosen from the high performance engineering polymers that can be used for the sheathing. The outer sheath 34 terminates on either side of the laminated layers 32 and 30 to form sealed edges 36 and 38. The sealed edges form the protective barrier previously discussed. This embodiment does not have the characteristic of not tending to curl although all the other benefits are present. Printed messages may be placed on the laminate before coating or on the tape after coating.

The steps in the method for manufacturing the sealed edge detectable tape can be varied depending on the colored coating desired, the type of reinforcement in the placement of printing on the tape. The following is a description of the manufacturing process which can be varied according to the desired end product.

In the first step, a roll of the selected ductile metal foil is laminated with one or both of a color coating and reinforcing material. The materials used in this process have been more fully described previously. The materials selected are laminated by a typical extrusion coating method and the coated foil laminate is taken up on a roll. The color coating is pre-selected for the end user and can be virtually any color. The reinforcing material is likewise chosen for strength desired in the finished tape.

The roll is then printed with a message in multiple parallel lines on the length of the roll with a pre-selected spacing between the messages on the width of the roll. The width of the printing depends in some part on the desired width of the finished tape. The printed message must be sized to fit the width of the finished tape. The tape can be cut to any width and typically the width of the tapes are from 3 inches and larger depending on the use. Printing can be done on either side of the laminate. The usual tape has the printing over a color coating. After printing, the laminate is placed on a take up roll. This step is omitted if no printing is desired under the thermoplastic coating.

The next step is to slit the roll into the desired widths. If the roll is printed the slits are made between the printed messages. This step yields a number of laminated foil tapes. Then the laminated foil tapes are placed on a roll with spacers in between each rolled tape. The tapes are run parallel according to the spacers on the roll through a coating machine to apply a continuous thermoplastic film to one side and in between the tapes. This roll is taken up and run through the same coating process to lay down a thermoplastic film on the other side of the roll. With the second coating, a seal is made with the first film layer and the second film layer in between each tape. The films can be laid down by a number of processes however, the usual extrusion method where a hot coating or film contacts the first film layer and causes the seal by heat adhesion is the most common method. The roll coming off this step is a parallel lines of coated tapes with bands of sealed film in between each tape.

The roll of heat sealed tapes is taken up and slit a second time through the sealed film bands between the tapes. The extension of the sealed edge on either side of the tape depends on the size of spacer used in the roll on which the coated foil tapes were placed. A sealed edge of ¼ inch or more can be achieved by using spacers of ½ inch or more an slitting in the middle of the sealed film band. The laminated foil is enclosed in a sheath of thermoplastic film with sealed edges and is protected from moisture or other environmental elements. The sealed edge detectable tapes are now ready for use. In some cases, printing may be desired on the thermoplastic coating on the outside.

In manufacturing the sealed edge detectable tape that does not have a separate reinforcing fabric or layer, the foil layer is not laminated to a reinforcing material in the first step. The other steps are followed. The thermoplastic film coating is of a resin with high tensile strength which provides a sheath for the foil, but also reinforces the tape so it will not stretch and cause the foil to tear. Printing and color coating steps are the same as the reinforced version.

What is claimed is:
1. A detectable tape comprising
   a layer of ductile metal foil having two surfaces, a first surface and a second surface, and two sides, each side culminating in an edge,
   a first film of thermoplastic material coating the first surface of the foil and extending beyond the foil's edges to form two strips, a first strip and a second strip, adjacent to and along the foil's edges,
   a second film of thermoplastic material coating the secodn surface of the foil and extending beyond the foil's edges to form two strips, a third strip and a fourth strip, adjacent to and along the foil's edges, and
   the first and third strips overlapping and sealed together to form a protective barrier along the foil edge to which they are adjacent, and the second and fourth strips overlapping and sealed together to form a protective barrier along the foil edge to which they are adjacent.

2. A detectable tape of claim 1 wherein said ductile metal foil is color coated.

3. A detectable tape of claim 1 wherein the tape bears a printed message on at least one side.

4. A detectable tape of claim 1 wherein said thermoplastic material is a resin with tensile strength which provides reinforcement to the tape.

5. A detectable tape of claim 4 wherein said resin is selected from the group consisting essentially of polyester, oriented polypropylene, nylon and high performanace engineering polymers and mixtures thereof.

6. A detectable tape comprising
a layer of ductile metal foil having two surfaces, a first surface and a second surface, and two sides, each side cullinating in an edge,
a first film of thermoplastic material coating the first surface of the foil and extending beyond the foil's edges to form two strips, a first strip and a second strip, adjacent to and along the foil's edges,
a second film of thermoplastic material coating the second surface of the foil and extending beyond the foil's edges to form two strips, a third strip and a fourth strip, adjacent to and along the foil's edges, and
the first and third strips overlapping and sealed together to form a protective barrier along the foil edge to which they are adjacent, and the second and fourth strips overlapping and sealed together to form a protective barrier along the foil edge to which they are adjacent, and
a layer of reinforcing material laminated to the layer of metal foil.

7. A detectable tape of claim 6 wherein a printed message is applied to at least one side of the laminate underneath said thermoplastic material.

8. A detectable tape of claim 6 wherein a printed message is applied to at lest one surface of said thermoplastic material.

9. A detectable tape of claim 6 wherein said ductile metal foil is chosen from the group consisting essentially of aluminum, cooper, steel, iron and silver.

10. A detectable tape of claim 6 wherein said reinforcing material is selected from the group consisting of polypropylene non-woven fabric, polyester film, oriented polypropylene, nylon, high performance engineering polymers, polyimide fibers and carbon fibers.

11. A detectable tape of claim 6 wherein said thermoplastic material is low density polyethylene.

12. A detectable tape of claim 6 wherein said layer of foil is laminated with a layer of color coating between the foil layer and the reinforcing material.

13. A detectable tape of claim 12 wherein said layer of color coating is a low density polyethylene film impregnated with color stable pigment.

14. A detectable tape comprising
a layer of aluminum foil,
a layer colored coating resin laminated to said foil,
a layer of substantially transparent polyethylene non-woven fabric laminated over said layer of color coating resin so that the color is visible through said non-woven fabric, and
a sheath of thermoplastic coating which surrounds said layers of said foil, colored coating resin and non-woven fabric.

15. A detectable tape fo claim 14 wherein a printed message is applied to at least one side of the tape under the sheath of thermoplastic coating.

16. a detectable tape of claim 14 wherein a printed message is applied to at least one side of said tape in said sheath of thermoplastic coating.

* * * * *